(12) United States Patent
Ishida et al.

(10) Patent No.: US 9,223,083 B2
(45) Date of Patent: Dec. 29, 2015

(54) MULTICORE FIBER

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/548,896

(22) Filed: Nov. 20, 2014

(65) Prior Publication Data

US 2015/0147040 A1    May 28, 2015

(30) Foreign Application Priority Data

Nov. 22, 2013   (JP) ................. 2013-242036

(51) Int. Cl.
*G02B 6/036*   (2006.01)
*G02B 6/02*    (2006.01)

(52) U.S. Cl.
CPC ........ *G02B 6/02042* (2013.01); *G02B 6/03644* (2013.01)

(58) Field of Classification Search
CPC .................. G02B 6/02042; G02B 6/03644
USPC .......................................... 385/126
See application file for complete search history.

(56) References Cited

U.S. PATENT DOCUMENTS

2010/0296784 A1 *  11/2010  Imamura ............. 385/126
2014/0003779 A1    1/2014   Arakawa et al.

FOREIGN PATENT DOCUMENTS

| JP | 2011-215556 A | 10/2011 |
| WO | 2010/073821 A1 | 7/2010 |
| WO | 2012/121027 A1 | 9/2012 |

OTHER PUBLICATIONS

Office Action dated Jun. 23, 2015, issued in counterpart Japanese application No. 2013-242036, with English translation. (6 pages).

* cited by examiner

*Primary Examiner* — Jerry Blevins
(74) *Attorney, Agent, or Firm* — Westerman, Hattori, Daniels & Adrian, LLP

(57) ABSTRACT

A multicore fiber includes a plurality of cores, a cladding that encloses the plurality of the cores, and a marker disposed in the cladding. The plurality of the cores is arranged and disposed on a linear line passed through the center of the cladding. The marker is disposed along the length direction of the cladding on a portion on which the marker does not overlap the cores in a first direction in which the plurality of the cores is arranged on the linear line and does not overlap the core in a second direction orthogonal to the first direction.

4 Claims, 5 Drawing Sheets

MULTICORE FIBER

BACKGROUND OF THE INVENTION

The present invention relates to a multicore fiber, and is preferred to the case where a connection to another optical component is further simplified.

Presently, an optical fiber for use in a generally popular optical fiber communication system has a structure in which a single core is enclosed with a cladding and an optical signal is propagated through this core to transmit information.

In the optical fiber communication system in these years, a large number of optical fibers ranging from a few tens to a few hundreds optical fibers are used, and the volume of information transmitted are dramatically increased. In order to reduce the number of optical fibers in such an optical fiber communication system, such a multicore fiber is proposed in which a plurality of cores is enclosed with a cladding.

Moreover, in order to facilitate a connection between these multicore fibers, Patent Document 1 below proposes a multicore fiber in which a cladding includes a marker along the length direction of the cladding. In the multicore fiber in Patent Document 1, the marker is disposed on a portion overlapping in the direction in which a plurality of cores is arranged.

CITATION LIST

Patent Document

[Patent Document 1] WO 2012/121027 A

SUMMARY OF THE INVENTION

In the case where multicore fibers described in Patent Document 1 are connected to each other, the end faces of the multicore fibers are opposed to each other, and light is entered on the multicore fibers. Generally, such a method is adopted in which the end face portions of the multicore fibers are then shot from two directions of the side surfaces of the multicore fibers orthogonal to each other and the multicore fibers are aligned based on the shot result.

However, since the marker according to Patent Document 1 is disposed at a portion overlapping in the direction in which a plurality of cores is arranged, the marker is not shot on the shot images from the directions because the marker is in the blind spot of the cores.

Therefore, it is difficult to determine whether the marker is located on one side or the other side of the boundary of the directions only using the shot image in the direction orthogonal to the direction in which the plurality of the cores is arranged. As a result, there is a concern that the multicore fiber is inaccurately aligned unless a measure is taken such as the provision of another marker.

Therefore, it is an object of the present invention to provide a multicore fiber that can further simplify a connection to another optical component.

In order to solve the problem, the present invention is a multicore fiber including: a plurality of cores; a cladding that encloses the plurality of the cores; and a marker disposed in the cladding. The plurality of the cores is arranged and disposed on a linear line passed through a center of the cladding. The marker is disposed along in a length direction of the cladding on a portion on which the marker does not overlap the cores in a first direction in which the plurality of the cores is arranged on the linear line and the marker does not overlap the core in a second direction orthogonal to the first direction.

In the multicore fiber, in the case where light entered on the multicore fiber is seen from the side surfaces of the multicore fiber, the marker can be visually recognized from both of the first direction in which the plurality of the cores is arranged and the second direction orthogonal to the first direction. Therefore, the states of the cores in the first direction and the second direction in the cross section of the multicore fiber can be three-dimensionally captured using only a single marker, and the multicore fiber can be accurately aligned without taking any measures such as providing another marker. Thus, the multicore fiber according to the present invention can further simplify a connection to another optical component.

Moreover, preferably, the marker is disposed on a portion apart from the plurality of the cores over a distance between center axes of the plurality of the cores.

In this case, it is possible to reduce the crosstalk between the cores almost the same as the case where the marker is not provided.

Furthermore, the marker may be disposed on a portion that is not located on a linear line passed through the center axis of the cladding along the second direction, or the marker may be disposed on a portion located on a linear line passed through the center axis of the cladding along the second direction.

As described above, according to the present invention, there is provided a multicore fiber that can further simplify a connection to another optical component.

DETAILED DESCRIPTION OF THE INVENTION

In the following, preferred embodiments for implementing the present invention will be described in detail with reference to the drawings.

1. First Embodiment

Figure 1:
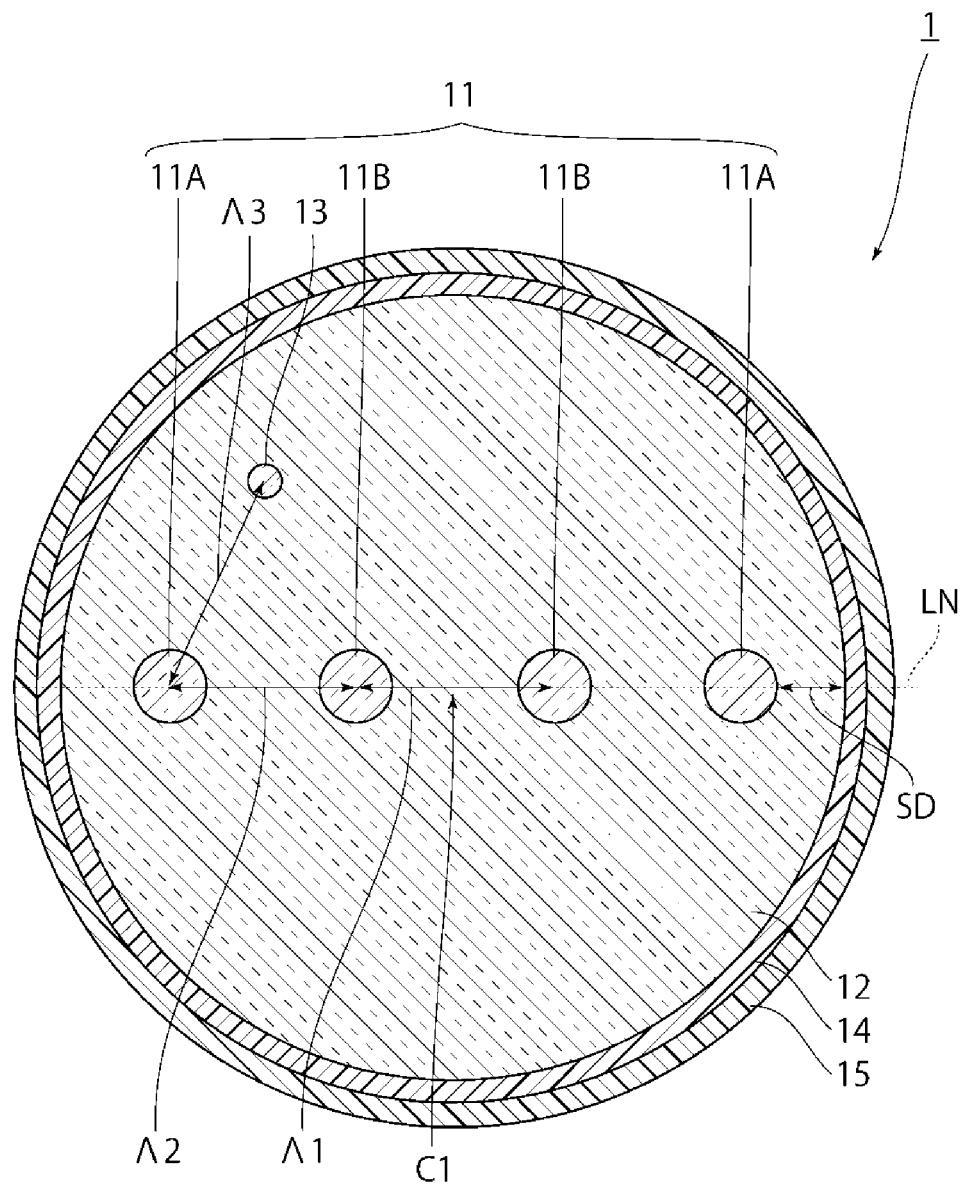
FIG. 1 is a diagram of a cross section perpendicular to the longitudinal direction of a multicore fiber according to a first embodiment.

FIG. 1 is a diagram of a cross section perpendicular to the longitudinal direction of a multicore fiber 1 according to a first embodiment. As illustrated in FIG. 1, the multicore fiber 1 according to the embodiment includes a plurality of cores 11, a cladding 12 that encloses the plurality of the cores 11, a marker 13 disposed in the cladding 12, a first protective layer 14 that encloses the cladding 12, and a second protective layer 15 that encloses the first protective layer 14 as main components.

The plurality of the cores 11 is arranged and disposed on a linear line LN passed through a center axis C1 of the cladding 12, and includes a pair of outer cores 11A located on the outermost positions and inner cores 11B sandwiched between the pair of the outer cores 11A.

In the case of the embodiment, the number of the inner cores 11B is two, and a distance Λ1 between the center axes of the inner cores adjacent to each other is set greater than a distance Λ between the center axes of the outer core 11A and the inner core 11B located next to the outer core 11A. The distances Λ1 and Λ between the center axes are set to a length in a range of 24 μm or greater and 35 μm or less.

It is noted that in FIG. 1, the centers of the cores 11 are located on the linear line LN passed through the center axis C1 of the cladding 12. However, it may be fine that the centers of the cores 11 are at positions displaced from the linear line passed through the center axis C1 of the cladding 12 as long as the cores 11 are arranged and disposed on the linear line LN.

Moreover, the difference in the cutoff wavelength between the outer core 11A and the inner core 11B located next to the outer core 11A is set at a wavelength of 100 nm or less, and a shortest distance SD between the outer circumferential surface of the outer core 11A and the outer circumferential surface of the cladding 12 is set to a length in a range of 15 μm or greater and 62.5 μm or less.

The marker 13 is formed of a glass member having an average refractive index higher than the average refractive index of the cladding 12 and lower than the average refractive index of the core 11. For example, the core 11 is formed of silica doped with a dopant that increases the average refractive index such as germanium, the cladding 12 is formed of pure silica, and the marker 13 is formed of silica doped with a dopant whose amount is lower than the amount of the dopant of the core 11.

In the case of the embodiment, the outer shape of the marker 13 in the cross section is in a circular shape, and the cross sectional area of the marker 13 is smaller than the cross sectional area of the core 11.

Figure 2:
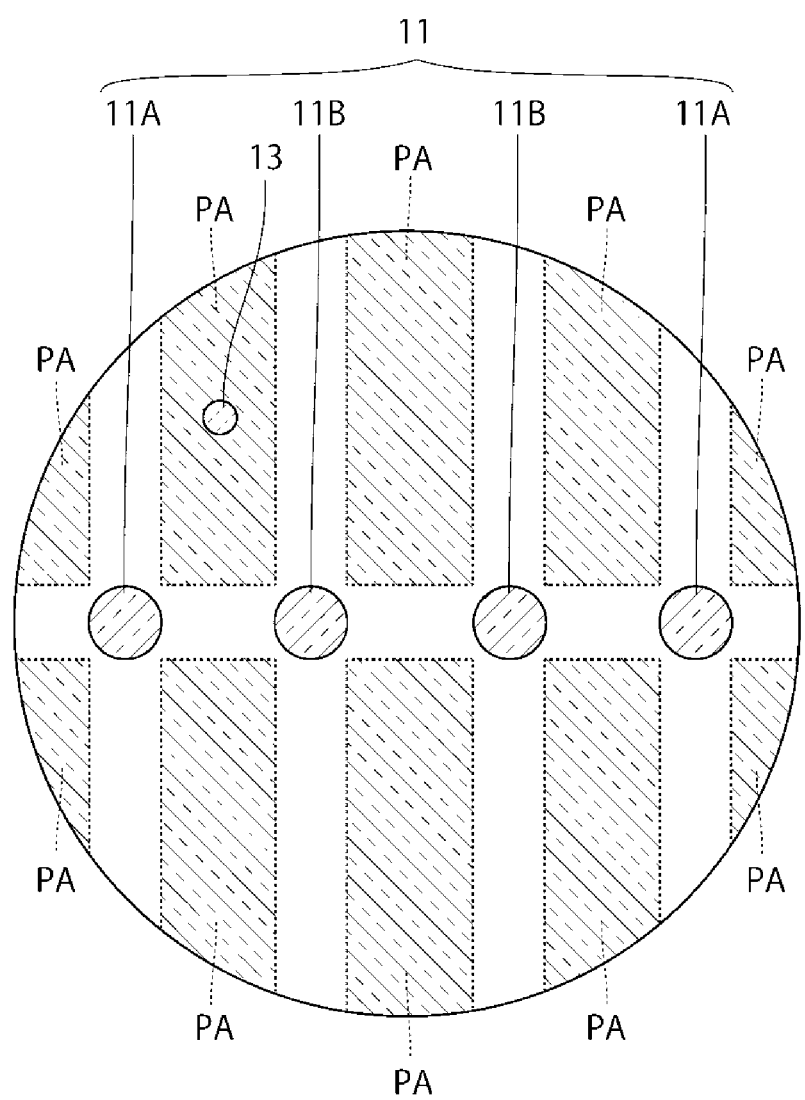
FIG. 2 is a diagram of a portion on which a marker is to be disposed in the same point of view as in FIG. 1.

As illustrated in FIG. 2, the marker 13 is disposed along the length direction of the cladding 12 on a portion PA on which the marker 13 does not overlap the cores 11 in a first direction in which the plurality of the cores 11 is arranged on the linear line and does not overlap the core 11 in a second direction orthogonal to the first direction.

A distance Λ3 between the center axes of the marker 13 and the core 11 closest to the marker 13 is set greater than the distance Λ between the center axes of the outer core 11A and the inner core 11B located next to the outer core 11A. In other words, the marker 13 is disposed on the portion apart from the plurality of the cores 11 over the distances Λ1 and Λ2 between the center axes of the plurality of the cores.

It is noted that in the case of the embodiment, the marker 13 is disposed on a portion that is not located on a linear line passed through the center axis C1 of the cladding 12 along the second direction.

In the multicore fiber 1 as described above, the marker 13 is disposed along the length direction of the cladding 12 on the portion PA on which the marker 13 does not overlap the cores 11 in the first direction in which the plurality of the cores 11 is arranged on the linear line and does not overlap the core 11 in the second direction orthogonal to the first direction.

In the multicore fiber 1, in the case where light entered on the plurality of the individual cores 11 is seen from the side surfaces of the multicore fiber, the marker 13 can be visually recognized from both of the first direction and the second direction.

Therefore, the states of the cores 11 in the first direction and the second direction in the cross section of the multicore fiber can be three-dimensionally captured only using a single marker 13 without taking any measures such as providing another marker.

Therefore, the multicore fiber 1 according to the embodiment can be accurately aligned in connecting the multicore fiber 1 to another multicore fiber. Thus, the multicore fiber 1 according to the embodiment can further simplify a connection to another optical component.

Moreover, the marker 13 is disposed on the portion apart from the plurality of the cores 11 over the distances Λ1 and Λ between the center axes of the plurality of the cores, so that it is possible to reduce the crosstalk between the cores almost the same as the case where the marker 13 is not provided.

Furthermore, the marker 13 is disposed on the portion that is not located on the linear line passed through the center axis C1 of the cladding 12 along the second direction. Therefore, the marker 13 is located in asymmetry in the first direction relative to the center axis C1, so that it is possible to easily identify the cores 11, as compared with the case where the marker 13 is located in symmetry in the first direction.

Meanwhile, in the case of the embodiment, the distance Λ1 between the center axes of the inner cores 11B adjacent to each other is greater than the distance Λ between the center axes of the outer core 11A and the inner core 11B located next to the outer core 11A.

Therefore, it is possible to reduce the shortest distance SD while suppressing the crosstalk between the inner cores 11B, as compared with the case where the distances Λ1 and Λ between the center axes are almost the same.

Moreover, the distances Λ1 and Λ between the center axes are set to a length of 24 μm or greater, so that it is possible to effectively suppress the crosstalk between the cores adjacent to each other. The distances Λ1 and Λ between the center axes are set to a length of 35 μm or less, so that it is possible to suppress an increase in the outer diameter of the multicore fiber 1.

Furthermore, in the case of the embodiment, the shortest distance SD between the outer circumferential surface of the outer core 11A and the outer circumferential surface of the cladding 12 is set to a length in a range of 15 μm or greater and 62.5 μm or less, so that it is possible to reduce the diameter while effectively suppressing the influence of disturbance on the cores 11. It is noted that the shortest distance SD is more preferably set to a length in a range of 20 μm or greater and 35 μm or less.

In addition, in the case of the embodiment, the difference in the cutoff wavelength between the outer core 11A and the inner core 11B, between which fluctuations in the cutoff wavelength most likely occur, is set at a wavelength of 100 nm or less. Therefore, even though the length of the multicore fiber 1 is for the short distance in a length of 1,000 m or less, it is possible that the difference in the cutoff wavelength between the cores adjacent to each other is made at a wavelength of 100 nm or less in all the plurality of the cores 11 enclosed by the cladding 12. Accordingly, it is possible to increase a communication waveband in which light can be propagated in the single mode, as compared with the case where the difference in the cutoff wavelength between the outer core 11A and the inner core 11B exceeds a wavelength of 100 nm.

2. Second Embodiment

Next, a second embodiment will be described in detail with reference to the drawings. However, components the same as or equivalent to the components of the first embodiment are designated the same reference numerals and signs, and the overlapping description will be appropriately omitted in the components of a multicore fiber according to the second embodiment.

Figure 3:
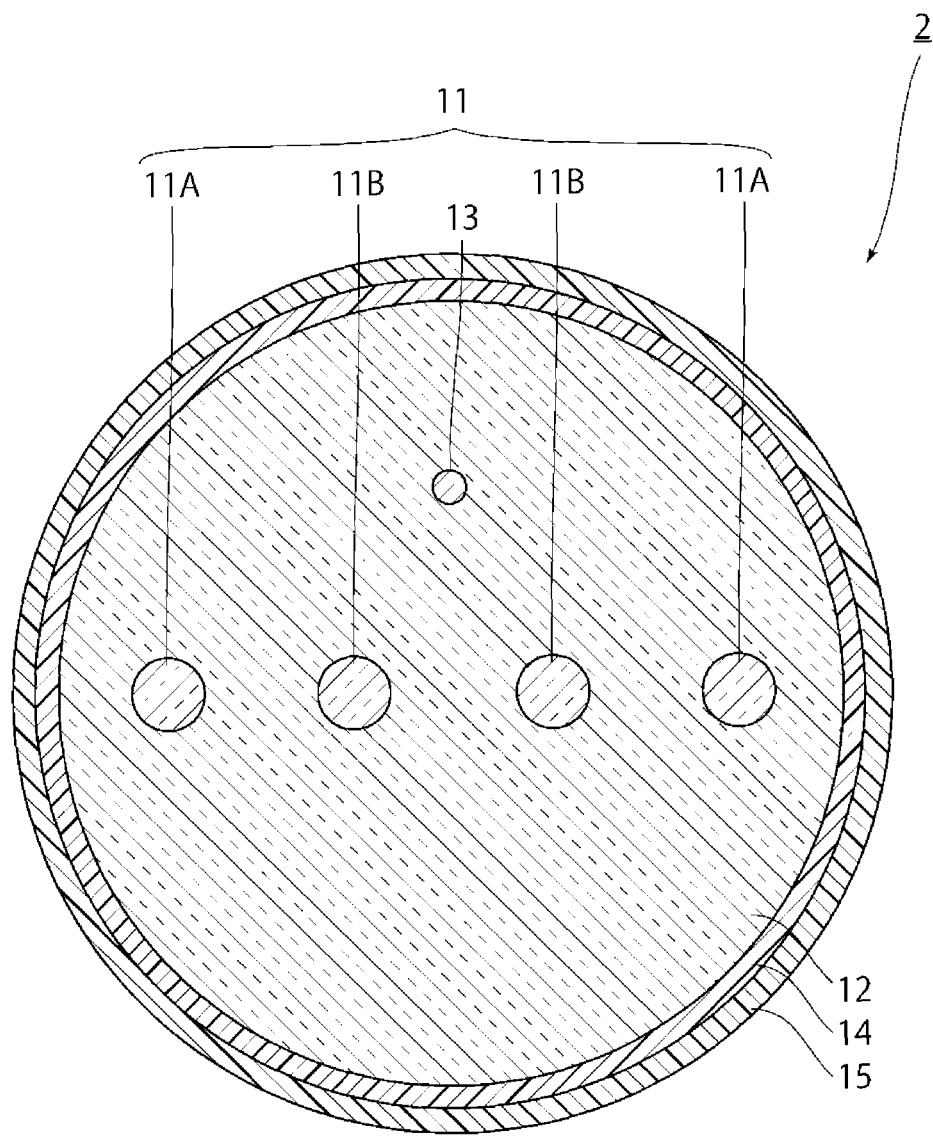
FIG. 3 is a diagram of a cross section perpendicular to the longitudinal direction of a multicore fiber according to a second embodiment.

FIG. 3 is a diagram of a cross section perpendicular to the longitudinal direction of a multicore fiber 2 according to the second embodiment. As illustrated in FIG. 3, the multicore fiber 2 according to the embodiment is different from the first embodiment in a portion on which a marker 13 is disposed.

The marker 13 according to the embodiment is different from the case of the first embodiment where the marker 13 is disposed on the portion that is not located on the linear line passed through the center axis C1 of the cladding 12 along the second direction in that the marker 13 is disposed on a portion located on the linear line.

It is noted that the marker 13 according to the embodiment is disposed along the length direction of a cladding 12 on a portion PA on which the marker 13 does not overlap cores 11 in the first direction and the second direction as similar to the first embodiment. Moreover, the marker 13 according to the embodiment is disposed on the portion apart from the plurality of the cores 11 over the distances $\Lambda 1$ and $\Lambda$ between the center axes of the plurality of the cores as similar to the first embodiment.

According to the multicore fiber 2, as similar to the first embodiment, it is possible to further simplify a connection to another optical component as well as it is possible to reduce the crosstalk between the cores almost the same as the case where the marker 13 is not provided.

3. Exemplary Modifications

In the embodiments, the number of the inner cores 11B is two. However, the number of the inner cores 11B may be one or may be three or greater. It is noted that in the case where the number of the inner cores 11B is two or greater, it may be fine that the distance $\Lambda 1$ between the center axes of the inner cores 11B adjacent to each other is almost the same as the distance $\Lambda$ between the center axes of the outer core 11A and the inner core 11B located next to the outer core 11A. However, in the case where the shortest distance SD is reduced while suppressing the crosstalk between the inner cores 11B, the distance $\Lambda 1$ is preferably greater than the distance $\Lambda$ as described above.

In the embodiments, the marker 13 is formed of a glass member having an average refractive index higher than the average refractive index of the cladding 12 and lower than the average refractive index of the core 11. However, it may be fine that the marker 13 is formed of a glass member having an average refractive index lower than the average refractive index of the cladding 12 and the average refractive index of the core 11. For example, the core 11 is formed of silica doped with a dopant that increases the average refractive index such as germanium, the cladding 12 is formed of pure silica, and the marker 13 is formed of silica doped with a dopant that reduces the average refractive index such as fluorine. Moreover, the marker 13 may be a hole.

Furthermore, in the embodiments, the outer shape of the marker 13 in the cross section is in a circular shape. However, various shapes can be adapted to the outer shape other than a circular shape.

In addition, in the embodiment, the cross sectional area of the marker 13 is made smaller than the cross sectional area of the core 11. However, it may be fine that the cross sectional area of the marker 13 is equal to or greater than the cross sectional area of the core 11. It is noted that in the case where the cross sectional area of the marker 13 is different from the cross sectional area of the core 11, it is possible to further improve the ease of identification of the marker 13 in alignment, as compared with the case where the cross sectional area of the marker 13 is the same as the cross sectional area of the core 11. Moreover, in the case where the cross sectional area of the marker 13 is different from the cross sectional area of the core 11, it is possible to further suppress the crosstalk between the cores, as compared with the case where the cross sectional area of the marker 13 is the same as the cross sectional area of the core 11.

The multicore fiber according to the present invention can be appropriately combined, omitted, modified, and added with publicly known techniques, for example, without deviating from the object of the present application, other than the content described above.

4. Connecting Method for Multicore Fiber

Figure 4:
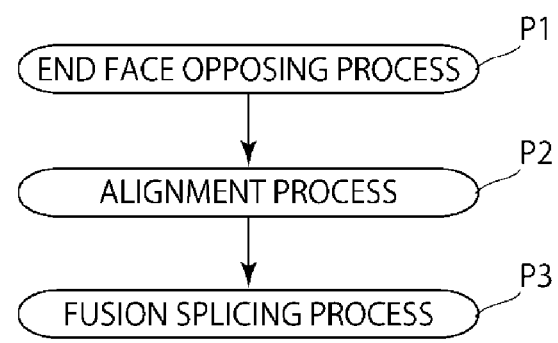
FIG. 4 is a flowchart of a connecting method for the multicore fiber.

Next, a connecting method for the multicore fiber will be described in detail with reference to the drawings. FIG. 4 is a flowchart of a connecting method for the multicore fiber. As illustrated in FIG. 4, the connecting method for the multicore fiber includes an end face opposing process P1, an alignment process P2, and a fusion splicing process P3 as main processes.

<End Face Opposing Process>

The end face opposing process P1 is the process of opposing the end faces of a pair of multicore fibers to be connected to each other in such a manner that the center axes of the multicore fibers are matched with each other.

Figure 5:
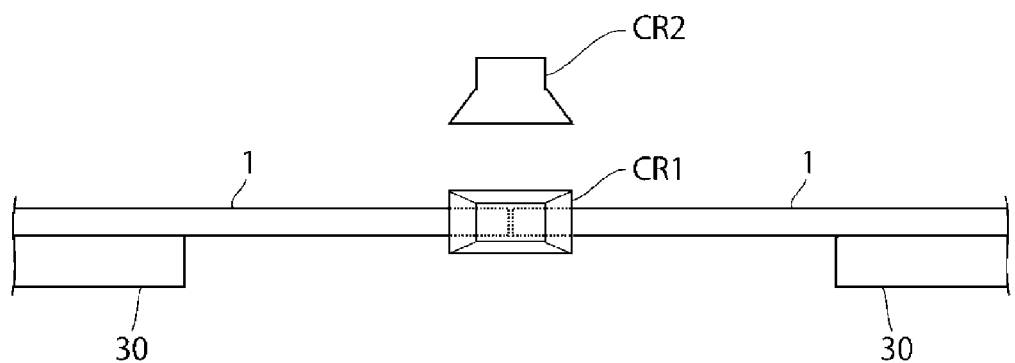
FIG. 5 is a diagram of the manner of connecting a pair of multicore fibers to each other.

FIG. 5 is a diagram of the manner of connecting a pair of multicore fibers to each other. It is noted that FIG. 5 illustrates a manner of connecting a pair of the multicore fibers 1 according to the first embodiment to each other for convenience.

As illustrated in FIG. 5, in the process, the pair of the multicore fibers 1 is placed on a mounting stage 50, and the end faces of the multicore fibers 1 are opposed to each other in the state in which the center axes of the multicore fibers 1 are matched with each other.

It is noted that a gap may be provided or may not be provided between the end faces as long as the end faces are opposed to each other to the extent that light can be propagated from one to the other of the pair of the multicore fibers 1.

Moreover, it may be fine that the diameters of the claddings 12 are different between the pair of the multicore fibers 1 as long as the relative positional relationship between the core 11 and the marker 13 is the same between the pair of the multicore fibers 1, and it may be fine that the thicknesses of the first protective layer 14 and the second protective layer 15 are different between the multicore fibers 1.

<Alignment Process>

The alignment process P2 is the process of adjusting the optical axes of the cores 11 of the pair of the multicore fibers in which the end faces are opposed to each other.

In the first stage, as illustrated in FIG. 5, the end face portions of the pair of the multicore fibers 1 are shot from two directions of the side surfaces of the multicore fibers orthogonal to each other using a first camera CR1 and a second camera CR2. At this time, light is entered on the multicore fibers 1.

In the second stage, the multicore fibers 1 are rotated based on the shot result of the first camera CR1, for example, of the two cameras.

Figure 6:
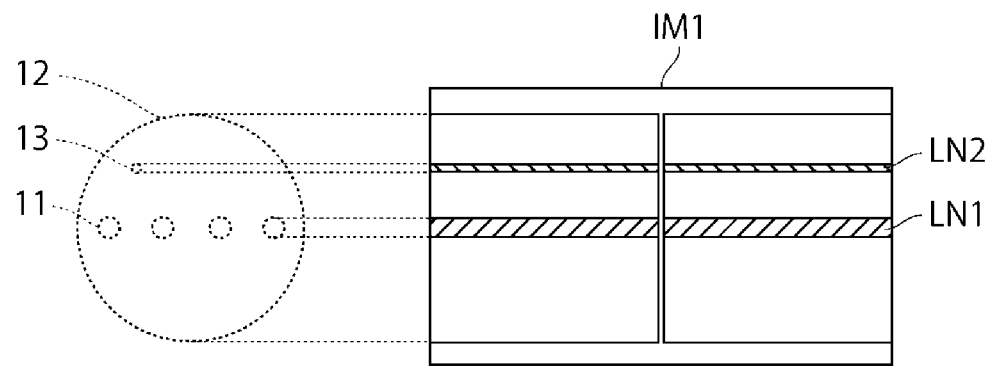
FIG. 6 is a schematic diagram of a shot result of a first camera in an alignment process.

In other words, as illustrated in FIG. 6, the multicore fibers 1 are rotated in such a manner that a state is provided in which a single projection line LN1 of light propagated through the core 11 and a single projection line LN2 of light propagated through the marker 13 appear on an image IM1 shot by the first camera CR1.

More specifically, for example, a computer connected to the first camera CR1 gives an instruction to a rotating device provided on the multicore fibers 1 to rotate the multicore fibers 1 until the projection lines LN1 and LN2 appear on the image IM1.

In the third stage, the multicore fibers 1 are rotated using the second camera CR2, for example, which is different from the camera used in the second stage.

Figure 7:
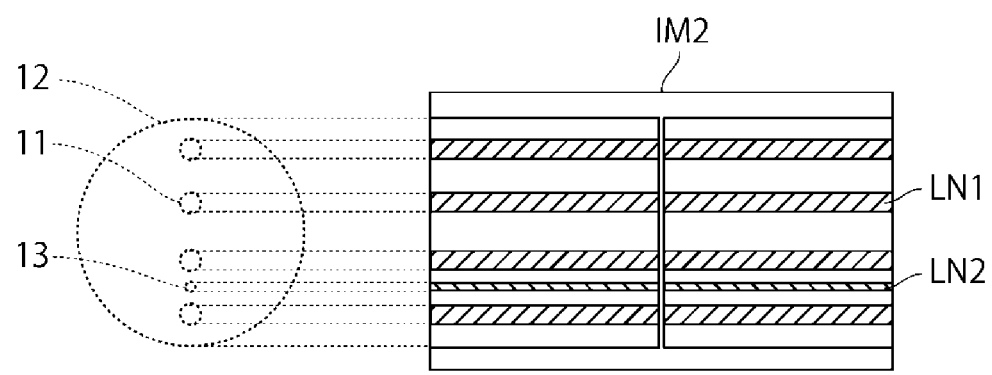
FIG. 7 is a schematic diagram of a shot result of a second camera in the alignment process.

In other words, as illustrated in FIG. 7, the multicore fibers 1 are rotated in such a manner that a state is provided in which four projection lines LN1 of light propagated through the core 11 appear in the same width and a single projection line LN2 of light propagated through the marker 13 appears on an image IM2 shot by the second camera CR2.

More specifically, for example, a computer connected to the second camera CR2 gives an instruction to a rotating device provided on the multicore fibers 1 to rotate the multicore fibers 1 until four projection lines LN1 in the same width and a single projection line LN2 appear on the image IM2.

As described above, in the process, the multicore fibers 1 are aligned based on the shot result of the first camera CR1 and the shot result of the second camera CR2.

<Fusion Splicing Process>

The fusion splicing process P3 is the process of fusion splicing the end faces of the pair of the multicore fibers to each other after subjected to the alignment process P2. More specifically, the end faces are fusion-spliced to each other using an oxyhydrogen burner or by arc welding, for example.

As described above, a pair of multicore fibers to be subjects for connection can be connected to each other as in turn subjected to the end face opposing process P1, the alignment process P2, and the fusion splicing process P3.

In the description above, an example is described that multicore fibers are connected to each other. However, the present invention is also applicable to the connection of a multicore fiber to a planner waveguide including a plurality of cores and to the connection of a multicore fiber to a transmitter-receiver.

The invention claimed is:

1. A multicore fiber comprising:
   a plurality of cores;
   a cladding that encloses the plurality of the cores; and
   a marker disposed in the cladding, wherein
   the plurality of the cores is arranged and disposed on a linear line passed through a center of the cladding, and
   the marker is disposed along in a length direction of the cladding on a portion on which the marker does not overlap the cores in a first direction in which the plurality of the cores is arranged on the linear line and the marker does not overlap the core in a second direction orthogonal to the first direction so that the marker is visually recognizable from the first direction and the second direction.

2. The multicore fiber according to claim 1, wherein the marker is disposed on a portion apart from the plurality of the cores over a distance between center axes of the plurality of the cores.

3. The multicore fiber according to claim 2, wherein the marker is disposed on a portion that is not located on a linear line passed through the center axis of the cladding along the second direction.

4. The multicore fiber according to claim 2, wherein the marker is disposed on a portion located on a linear line passed through the center axis of the cladding along the second direction.

* * * * *